Patented Jan. 16, 1951

2,538,047

UNITED STATES PATENT OFFICE 2,538,047

CHLOROBUTADIENE POLYMERS HAVING IMPROVED RESISTANCE TO THE DETERIORATING EFFECTS OF HEAT AND LIGHT

Paul A. Sanders, Wilmington, and John R. Vincent, Newport, Del., assignors to E. I. du Pont de Nemours & Company, Wilmington, Del., a corporation of Delaware No Drawing. Application July 27, 1948, Serial No. 40,997

4 Claims. (Cl. 260—45.75)

This invention relates to the preparation of chlorobutadiene polymers which have improved resistance to the deteriorating effects of heat and light.

It is recognized that many polymers, and more particularly elastomers including natural rubber and synthetic rubbers, are often changed with regard to their physical characteristics on prolonged exposure to heat or light, and in many instances the deterioration may be of such a degree as to render articles made therefrom useless for the purpose for which they were originally designed. The deterioration is usually characterized by changes in physical properties such as loss of tensile strength, elongation and flexibility. Discoloration may occur and in addition, decomposition may be accompanied by the liberation of substantial amounts of hydrogen chloride from the chlorine containing polymer. The latter is particularly troublesome when the chlorine containing polymer is in contact with cellulosic materials, since partial or complete tendering of the fabric may occur. The instability to heat and light therefore materially limits the possible applications of these polymers. In the case of elastomers, such as polymerized chloroprene (hereafter referred to as polychloroprene), deterioration during exposure to high temperatures can be retarded by vulcanization with zinc oxide in the presence of an antioxidant such as phenyl-beta-naphthylamine, but the stability thus achieved is not satisfactory when temperatures as high as 150° C. are involved.

Although properly compounded and vulcanized polychloroprene is very resistant to the effects of sunlight, there are some instances in which the absence of a vulcanizing agent would be desirable. In these cases, however, the deterioration of thin films, such as those in coated fabrics, is severe during sunlight exposure, and complete tendering of the fabric may occur. The common antioxidants, or age-resistors, such as phenyl-beta-naphthylamine, are relatively ineffective. Tendering of the textile may be avoided by use of the proper amounts of a vulcanizing agent, such as zinc oxide, along with an antioxidant, but excessive stiffening of the coated fabric then occurs after prolonged exposure.

It is therefore an object of this invention to provide chlorobutadiene polymers which have improved resistance to the effect of heat and light. It is a further object of this invention to produce chlorobutadiene polymers, and more particularly polychloroprene, which exhibit little or no tendering of cellulose fibers when in intimate contact therewith and when subjected to temperatures of 150° C.

We have found that these objects may be accomplished by incorporating into the chlorobutadiene polymer a nickel salt of a substituted dithiocarbamic acid in which the nitrogen atom is directly attached to at least one carbon atom, which substituted dithiocarbamic acid does not contain in the molecule an excess of 25 carbon atoms and in which the substituting organic radicals individually contain not more than 12 carbon atoms. The preferred nickel salts are those of the dialkyl dithiocarbamic acids, particularly those in which each alkyl group contains from 1 to 12 carbon atoms. Nickel dibutyl dithiocarbamate is especially preferred. The invention is applicable to polymers, including co-polymers, of chlorine containing butadienes such as chloroprene, 2,3-dichlorobutadiene, and their homologs. Included in the chlorine-containing co-polymers to which the present invention relates are the products obtained by polymerizing mixtures of chloroprene with isoprene, styrene or acrylic nitrile, particularly those containing a major portion of the chlorobutadiene.

The stabilized polymers may be prepared by a variety of methods. Thus, when working with the polymers in latex form the nickel dialkyldithiocarbamate may be added in the form of an aqueous dispersion. If desired, vulcanizing agents, filters, antioxidants, etc., may also be added in the form of aqueous dispersions. Stabilized films may then be prepared from the compounded latex by the usual procedure such as dipping, casting, etc.

Stabilized dry polymer compositions may be obtained by adding the nickel dithiocarbamate to the polymer upon a rubber mill. Other compounding ingredients may be added, if desired.

Another method of preparing these stabilized polymers involves swelling or dissolving the polymer in an organic solvent, such as acetone or benzene, and adding the nickel dithiocarbamate directly. Mixing can be continued in a Banbury mixer and pigments, plasticizers, etc., added at that time. The solvent may be removed in the mixer, on a heated mill, or in any other manner customary in the art. If it is more expedient, the nickel dithiocarbamate may be formed in situ in any of the preceding operations by adding a nickel salt, such as nickel oxalate, and a dialkyl thiuram disulfide. Nickel dialkyldithiocarbamates are formed by the reaction of the two compounds during vulcanization or other heat treatment.

The following examples are given to illustrate the invention. Unless otherwise specified, the parts used are by weight.

EXAMPLE 1

An alkaline polychloroprene latex, made according to U. S. Patent 2,264,173, was compounded with nickel dibutyldithiocarbamate, dimethyldithiocarbamate and diethyl dithiocarbamate and, for comparison, phenyl-beta-naphthylamine, as indicated in the following table. These agents were added as dispersions prepared by grinding them in water containing a dinaphthylmethane sodium sulfonate and ammoniacal casein. The latices were applied to a high tenacity viscose rayon fabric, commonly sold under the trade name "Cordura" rayon, by dipping. After drying for four hours at 70° C., portions of the fabric were aged at 150° C. in an air oven. Tensile strengths of the coated fabric before and after aging were determined by pulling strips, one centimeter in width, on a Schopper tensile machine. The stabilizing effect of the nickel dialkyldithiocarbamates in retarding tendering of the rayon and their superiority in comparison with a standard antioxidant may be observed by Table I. It is also shown in the table that increasing the proportion of the nickel dialkyldithiocarbamate increases the stabilizing action.

*Table I*

| Stabilizer | Parts by Wt. per 100 parts of polychloroprene | Retention of Tensile Strength of Rayon, Aging Period at 150° C. in— | | | |
|---|---|---|---|---|---|
| | | 4 hrs. | 16 hrs. | 24 hrs. | 48 hrs. |
| | | Per cent | Per cent | Per cent | Per cent |
| None | | 0 | | | |
| Phenyl-beta-naphthylamine | 2 | 9 | 0 | | |
| Do | 4 | 12 | 0 | | |
| Nickel dibutyldithiocarbamate | 2 | | 66 | 0 | |
| Do | 4 | | 76 | 62 | 0 |
| Do | 8 | | | 71 | 28 |
| Nickel dimethyldithiocarbamate | 4 | | 51 | 32 | 0 |
| Nickel diethyldithiocarbamate | 4 | | 74 | 48 | 0 |

EXAMPLE 2

One hundred (100) parts of latex, prepared as in Example 1, was compounded with 8 parts of a 25% aqueous dispersion of nickel dibutyldithiocarbamate. Another 100 parts of latex was compounded with 6 parts of a 33% aqueous dispersion of phenyl-beta-naphthylamine.

"Cordura" rayon fabric was coated as in Example 1, and portions exposed in Florida for one month. Tensile strength determinations were then carried out on the aged fabrics. The stabilizing effect of the nickel dibutyldithiocarbamate may be observed by the data in Table II.

*Table II*

| Stabilizer | Retention of Tensile Strength of Rayon [1] |
|---|---|
| | Per cent |
| None | 0 |
| Phenyl-beta-naphthylamine | 61 |
| Nickel dibutyldithiocarbamate | 92 |

[1] After 1 month Florida exposure.

EXAMPLE 3

In order to illustrate the advantage of the nickel dialkyldithiocarbamates over other metallic dialkyldithiocarbamates, 100 parts of polychloroprene latex prepared as in Example 1 was compounded with 5 parts of a 50% aqueous dispersion of zinc oxide, 3 parts of a 33% aqueous dispersion of phenyl-beta-naphthylamine and 8 parts of a 25% dispersion of a metallic dibutyldithiocarbamate as specified in Table III. The compounded latices were applied to rayon "Cordura" fabric, as in Example 1. Portions of the coated fabric were then aged for 24 and 36 hours in the 150° C. air oven. The percentage retention of the aged fabrics are given in Table III.

*Table III*

| Metallic Dialkyldithiocarbamate | Retention of Tensile Strength of Coated Rayon Fabric | |
|---|---|---|
| | 24 hrs./150° C. | 36 hrs./150° C. |
| | Per cent | Per cent |
| None | 16 | 0 |
| Lead dibutyldithiocarbamate | 9 | 0 |
| Copper dibutyldithiocarbamate | 10 | 0 |
| Vanadium dibutyldithiocarbamate | 0 | 0 |
| Manganese dibutyldithiocarbamate | 0 | 0 |
| Uranium dibutyldithiocarbamate | 9 | 0 |
| Chromium dibutyldithiocarbamate | 6 | 0 |
| Silver dibutyldithiocarbamate | 5 | 0 |
| Ferric dibutyldithiocarbamate | 0 | 0 |
| Cadmium dibutyldithiocarbamate | 27 | 0 |
| Antimony dibutyldithiocarbamate | 26 | 0 |
| Thallium dibutyldithiocarbamate | 56 | 0 |
| Zinc dibutyldithiocarbamate | 60 | 0 |
| Sodium diethyldithiocarbamate | 64 | 0 |
| Nickel dibutyldithiocarbamate | 85 | 70 |

EXAMPLE 4

One hundred (100) parts of polychloroprene latex, prepared as in Example 1, was compounded with 5 parts of a 50% aqueous dispersion of zinc oxide and 8 parts of a 25% dispersion of phenothiazine. In addition, these latices were also compounded with 8 and 16 parts of a 25% dispersion of nickel dibutyldithiocarbamate. Rayon fabric was coated and dried as in Example 1, and portions thereof aged for 48 hours at 150° C. in an air oven. The stabilization conferred upon the polychloroprene by nickel dibutyldithiocarbamate may be seen from the data in Table IV. It is also evident that increasing the nickel dibutyldithiocarbamate from 4 to 8 parts per 100 parts of polychloroprene results in complete stabilization of the neoprene since the coated fabric loses substantially no more tensile strength than the untreated control.

*Table IV*

| Stabilizer | Retention of Tensile Strength of Rayon [1] |
|---|---|
| | Per cent |
| None | 0 |
| 4 parts Nickel dibutyldithiocarbamate | 48 |
| 8 parts Nickel dibutyldithiocarbamate | 63 |
| Rayon Control | 67 |

[1] After 48 hrs./150° C.

EXAMPLE 5

One hundred (100) parts of plastic polychloroprene, made according to U. S. Patent 2,234,215, was compounded on a mill by the following recipe:

| | Parts |
|---|---|
| Polychloroprene | 100.0 |
| Stearic acid | 0.5 |
| Semi-reinforcing black | 28.0 |
| Extra light calcined magnesium oxide | 4.0 |
| Light lubricating oil ("Circo" oil) | 1.0 |
| Zinc oxide | 5.0 |
| Phenyl-beta-naphthylamine | As in Table V |
| Nickel dibutyldithiocarbamate | As in Table V |

Slabs of the resulting stocks were prepared and cured for 30 minutes at 40 lbs. steam pressure. Slabs were then aged for 16 and 24 hours at 150° C. in an air oven, stress-strain properties being determined before and after aging. The effectiveness of nickel dibutyldithiocarbamate as a heat stabilizer, in comparison with a conventional age-resistor such as phenyl-beta-naphthylamine, may be seen by the data in Table V.

Table V

| Stabilizer | Parts | Stress-Strain Properties | | | Tensile Strength, p. s. i. | | |
|---|---|---|---|---|---|---|---|
| | | Original | Per Cent Elongation | | Original | 16 hrs. at 150° C. | 24 hrs. at 150° C. |
| | | | 16 hrs. at 150° C. | 24 hrs. at 150° C. | | | |
| None | | 740 | 75 | 60 | 2,575 | 725 | 825 |
| Phenyl-beta-naphthylamine | 2 | 885 | 185 | 135 | 2,675 | 1,125 | 1,000 |
| Nickel dibutyldithiocarbamate | 2 | 870 | 285 | 265 | 2,575 | 1,875 | 1,925 |

EXAMPLE 6

One hundred (100) parts of polychloroprene latex, prepared as in Example 1, was compounded with 8 parts of a 25% aqueous dispersion of tetraethyl thiuram disulfide. Similarly, another 100 parts of polychloroprene latex was compounded with 8 parts of a 25% dispersion of nickel oxalate and a third 100 parts was compounded with a mixture of 8 parts of a 25% dispersion of tetraethyl thiuram disulfide and 8 parts of a 25% dispersion of nickel oxalate. Strips of rayon fabric were coated with each latice as in Example 1, and allowed to dry at room temperature. Portions of each fabric were then aged for 4 hours in the 150° C. air oven and tensile strength determinations obtained before and after aging. It is evident from the data in Table VI that good stabilization can also be obtained by the mixture of nickel oxalate and tetraethyl thiuram disulfide. It is believed that the reaction product of these two compounds is nickel diethyldithiocarbamate.

Table VI

| Stabilizer | Retention of Tensile Strength of Coated Rayon [1] |
|---|---|
| | Per cent |
| None | 0 |
| 2 parts Tetraethyl thiuram disulfide | 14 |
| 2 parts Nickel oxalate | 9 |
| 2 parts Nickel oxalate+2 tetraethyl thiuram disulfide | 73 |

[1] After 4 hrs./150° C.

EXAMPLE 7

Plastic polychloroprene polymer, prepared as in Example 5 and containing 2.5 parts of tetraethyl thiuram disulfide, was compounded as follows:

| | Parts |
|---|---|
| Polychloroprene | 100.0 |
| Stearic acid | 0.5 |
| Titanium dioxide pigment | 40.0 |
| Extra light calcined magnesium oxide | 4.0 |
| Light lubricating ("Circo") oil | 1.0 |
| Zinc oxide | 5.0 |
| Nickel compound | 5.0 |

Ring specimens were cured for 30 minutes at 40 lbs. steam pressure and aged for 6 hours in a 150° C. air oven. Stress-strain properties were determined before and after aging on the Williams tensile machine (see Williams and Sturgis, Ind. Eng. Chem. 31, 1303 (1939)). The improvement in retention of elongation obtained with various nickel compounds is shown in Table VII.

Table VII

| Stabilizer | Retention of Elongation [1] |
|---|---|
| | Per cent |
| None | 40 |
| Nickel phthalate | 68 |
| Nickel naphthenate | 68 |
| Nickel chloride | 68 |
| Nickel dibutyl phosphate | 66 |
| Nickel "Lorol" thiophosphate [2] | 65 |
| Nickel pyridine nitrate | 60 |
| Nickel tetra amyl benzene sulfonate | 57 |
| Nickelous carbonate | 54 |
| Nickel borate | 53 |
| Nickel silicate | 52 |
| Nickel formate | 50 |

[1] After 6 hours at 150° C.
[2] Prepared from a mixture of primary straight-chain alcohols having an average of 13 carbon atoms.

EXAMPLE 8

To illustrate the stabilizing effect produced by these nickel dithiocarbamates upon interpolymers of chloroprene, the following stocks were compounded as called for in Table V, cured for 30 minutes at 141° C., aged for 6 and 16 hours at 150° C. in an air oven, and tested. The superior heat resistance of the stocks containing nickel dibutyldithiocarbamate, as judged by the per cent retention of elongation after aging, may be observed by the data in Table VIII.

Table VIII

| | A | B | C | D |
|---|---|---|---|---|
| | Parts by weight | Parts by weight | Parts by weight | Parts by weight |
| Chloroprene-acrylic nitrile interpolymer [1] | 100.0 | 100.0 | | |
| Chloroprene-isoprene interpolymer [2] | | | 100.0 | 100.0 |
| Stearic acid | 0.5 | 0.5 | 0.5 | 0.5 |
| Extra light calcined magnesia | 4.0 | 4.0 | 4.0 | 4.0 |
| "Circo" light process oil | 1.0 | 1.0 | 1.0 | 1.0 |
| Zinc oxide | 5.0 | 5.0 | 5.0 | 5.0 |
| Nickel dibutyldithiocarbamate | | 4.0 | | 4.0 |
| Retention of Elongation | | | | |
| | Per cent | Per cent | Per cent | Per cent |
| After 6 hours at 150° C. | 33 | 56 | 31 | 55 |
| After 16 hours at 150° C. | 11 | 41 | 3 | 30 |

[1] Polychloroprene prepared according to the method described in U. S. Patent 2,395,649.
[2] Prepared according to the method described in Ex. 1 of British Patent 573,024.

EXAMPLE 9

Ten (10) grams of poly-2,3-dichlorobutadiene-1,3 was dissolved at 100°–110° C. in 85 cc. of xylene along with 0.2 gram of nickel dibutyldithiocarbamate. The resultant dark, viscous solution was poured on a casting plate at 85° C. and the plate temperature gradually raised to 130° C. until the solvent was evaporated. After the solvent was evaporated, the light-yellow film was cooled quickly to room temperature and removed from the plate. Samples of the film thus obtained were exposed for 24 hours to circulating air at 150° C. and for 45 hours in a Fade-Ometer without any evidence of darkening or embrittlement. Moreover, the films so treated were still readily susceptible to cold drawing. On the other hand, control samples were markedly discolored and embrittled in 8 hours at 150° C. or in 8 hours' exposure in the Fade-Ometer.

EXAMPLE 10

The following example illustrates the effectiveness of low amounts of nickel dibutyldithiocarbamate in preventing the discoloration and surface cracking of highly loaded polychloroprene colored stocks during exposure to sunlight.

Polychloroprene was compounded by milling as follows, three different colors being used, a red, a blue and a green.

|  | A | B |
| --- | --- | --- |
|  | Parts by weight | Parts by weight |
| Polychloroprene (as in Ex. 5) | 100.0 | 100.0 |
| Rubber color | 1.3 | 1.3 |
| Nickel dibutyldithiocarbamate |  | 0.5 |
| Clay | 100.0 | 100.0 |
| Whiting | 100.0 | 100.0 |
| Magnesium Oxide | 4.0 | 4.0 |
| Zinc Oxide | 10.0 | 10.0 |
| Light lubricating oil | 30.0 | 30.0 |

Slabs, 1 inch x 3 inches, were cured for 30 minutes at 141° C. The slabs were mounted on a board which was placed in a window facing south. After six weeks' exposure to sunlight, the stocks containing no nickel dibutyldithiocarbamate were severely cracked and discolored. No discoloration or surface cracking was observed with those stocks which contained 0.5 part of the nickel dibutyldithiocarbamate.

The stabilizers of our invention are not confined to the nickel salts of the dialkyldithiocarbamic acids. The nitrogen may be mono-substituted or may be substituted by aromatic or hydroaromatic radicals, or may be the consitituent of a heterocyclic ring, such as that in morpholine or piperidine. This is illustrated in the following example.

EXAMPLE 11

One hundred (100) parts of polychloroprene latex, prepared as in Example 1, was compounded with 5 parts of a 50% aqueous dispersion of zinc oxide, 3 parts of a 33% aqueous dispersion of phenyl-beta-naphthylamine and 8 parts of a 25% dispersion of the nickel salt of 4-morpholine-carbodithioic acid. Similarly, latex was compounded using the nickel salt of 4,4'-methylene-bis-dithiocyclohexane carbamic acid. The compounded latices, including a control containing no stabilizer, were applied to "Cordura" rayon fabric as in Example 1, and aged at 150° C. in an air oven. The thermal stabilization obtained by the use of the nickel salts may be observed by the data in Table IX.

Table IX

| Stabilizer | Retention of Tensile Strength of Rayon Fabric [1] |
| --- | --- |
| Nickel salt of 4-morpholine carbodithioic acid | 67 |
| Nickel salt of 4,4'-methylene-bis-dithiocyclohexane carbamic acid | 31 |
| None (control) | 18 |

[1] After aging 24 hrs./150° C.

As further illustrative of the dithiocarbamates which have been found to impart improved properties to the chlorobutadiene polymers, illustrated in the specific examples above given, may be mentioned:

Nickel diallyldithiocarbamate
Nickel phenylethyldithiocarbamate
Nickel dicyclohexyldithiocarbamate
Nickel pentamethylenedithiocarbamate (from piperidine)
Nickel methylpentamethylenedithiocarbamate (from pipecoline)
Nickel di-isopropyldithiocarbamate
Nickel di-beta-ethylhexyldithiocarbamate
Nickel dibenzyldithiocarbamate
Nickel di-beta-hydroxyethyldithiocarbamate
Nickel dioctyldithiocarbamate
Nickel didodecyldithiocarbamate
Nickel methylglucaminedithiocarbamate
Nickel ethylene-bis-dithiocarbamate

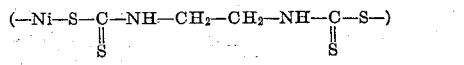

Nickel ethylene-bis-N,N'-dimethyldithiocarbamate

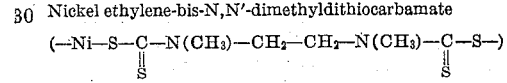

The amounts of stabilizer to be used depends upon the results desired and will vary in general from 0.1 to 10 parts for every 100 parts of polymer, for significant improvement in the properties of the chlorobutadiene polymers with regard to response to the effect of heat and light have been obtained when as little as 0.1 part of the stabilizer was employed for each 100 parts of polymer. The preferred range for general use, however, is from 1 to 4 parts of stabilizer. The stabilizers of this invention may be used with fillers, accelerators and any other types of compounding ingredients normally used in fabricating articles from the polymeric chlorine containing compounds.

As illustrated by the examples above given, the stabilizers of this invention are the substituted dithiocarbamic acids in which the nitrogen atom of the dithiocarbamic acid carries a hydrocarbon radical or a radical containing carbon, hydrogen and singly bonded oxygen such as the hydroxy substituted alkyls or the cyclic compounds such as morpholine, and the dithiocarbamic acid from methyl glucamine. The preferred class is that in which the dithiocarbamic acid has both hydrogens of the nitrogen atom substituted by hydrocarbon radical or radicals.

While the substituted dithiocarbamic acids specifically disclosed in exemplifying the present invention are those in which the substituting organic radicals individually contain not more than 12 carbon atoms and in which the substituted dithiocarbamic acid contains not more than 25 carbon atoms in the molecule, it will be obvious to those skilled in the art that the invention is not of necessity limited thereto, for the nickel salts of other substituted dithiocarbamic acids, when available, will operate in a similar manner as stabilizers for chlorobutadiene polymers.

The stabilizers of this invention may be used in chlorine containing polymers which have mixed with other resins and elastomers such as natural rubber or synthetic elastomers such as butadiene-styrene-copolymers or butadiene-acrylonitrile copolymers.

This invention provides a new class of heat and light stabilizers for chlorine containing polymers. They are particularly effective in chlorine containing elastomers such as polychloroprene, and may be used either in the presence or absence of conventional compounding ingredients such as zinc oxide, etc.

By the use of these stabilizers, chlorine-containing polymers are obtained which are remarkably resistant to the effects of heat and light.

We claim:

1. A chloro-1,3-butadiene polymer which has intimately incorporated therein from 0.01 to 10 parts, for every 100 parts by weight of the polymer, of a nickel salt of a substituted dithiocarbamic acid in which at least one hydrogen on the nitrogen atom is substituted by an organic radical of the group consisting of hydrocarbon radicals and radicals containing carbon, hydrogen and singly bonded oxygen, each individual substituting radical containing not more than 12 carbon atoms and the substituted dithiocarbamic acid from which the nickel salt is produced containing not more than 25 carbon atoms in the molecule.

2. A chloro-1,3-butadiene polymer which has intimately incorporated therein from 0.01 to 10 parts, for every 100 parts by weight of the polymer, of a nickel salt of a dithiocarbamic acid in which both hydrogens on the nitrogen atom have been substituted by at least one hydrocarbon radical containing not more than 12 carbon atoms.

3. A chloro-1,3-butadiene polymer which has intimately incorporated therein from 0.01 to 10 parts, for every 100 parts by weight of the polymer, of a nickel salt of a dithiocarbamic acid in which both hydrogens on the nitrogen atom have been substituted by identical alkyl groups each containing not more than 12 carbon atoms.

4. A chloro-1,3-butadiene polymer which has intimately incorporated therein from 0.01 to 10 parts, for every 100 parts by weight of the polymer, of the nickel salt of dibutyldithiocarbamic acid.

PAUL A. SANDERS.
JOHN R. VINCENT.

REFERENCES CITED

The following references are of record in the file of this patent:

UNITED STATES PATENTS

| Number | Name | Date |
|---|---|---|
| 2,230,138 | Ewart | Jan. 28, 1941 |
| 2,286,738 | Hill | June 16, 1942 |